(12) United States Patent
Nakajima

(10) Patent No.: US 6,464,591 B1
(45) Date of Patent: Oct. 15, 2002

(54) POWER TRANSMISSION SHAFT

(75) Inventor: Tatsuo Nakajima, Iwata (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/334,066

(22) Filed: Jun. 16, 1999

(30) Foreign Application Priority Data

Jun. 26, 1998 (JP) ............................................ 10-181041
May 17, 1999 (JP) ............................................ 11-136085

(51) Int. Cl.⁷ ................................................ F16C 3/02
(52) U.S. Cl. ....................... 464/181; 464/183; 138/141; 138/143; 428/36.91
(58) Field of Search .................................. 464/181, 183, 464/903; 428/36.91; 138/141, 143, DIG. 7, DIG. 10

(56) References Cited

U.S. PATENT DOCUMENTS

| | | |
|---|---|---|
| 4,131,701 A | 12/1978 | VanAuken |
| 4,265,951 A | 5/1981 | Yates et al. |
| 4,272,971 A | 6/1981 | Loyd et al. |
| 4,556,400 A * | 12/1985 | Krude et al. ................. 464/181 |
| 4,895,351 A * | 1/1990 | Devaud ................... 464/181 X |
| 5,059,582 A * | 10/1991 | Chung |
| 5,261,991 A | 11/1993 | Zackrisson et al. |
| 5,279,874 A * | 1/1994 | Ichikawa et al. .... 428/36.91 X |
| 5,281,454 A * | 1/1994 | Hanson ............... 428/36.91 X |

FOREIGN PATENT DOCUMENTS

GB 2008720 A 6/1979

* cited by examiner

Primary Examiner—Lynne H. Browne
Assistant Examiner—Grey Binda
(74) Attorney, Agent, or Firm—Arent Fox Kintner Plotkin & Kahn

(57) ABSTRACT

A power transmission shaft is constructed by winding a membrane, film, foil or thin sheet in layers and comprising a longitudinal middle portion composed of FRP layers alone, a transitional portion disposed between the middle portion and each endportion and composed of a composite layer of FRP layers and metal layers, the end portions being composed of metal layers alone. The joining, as by welding, pinning, press-fitting, or friction welding, of metal ports, such as joint elements, is effected at the ends or the ends and transitional portions.

13 Claims, 10 Drawing Sheets

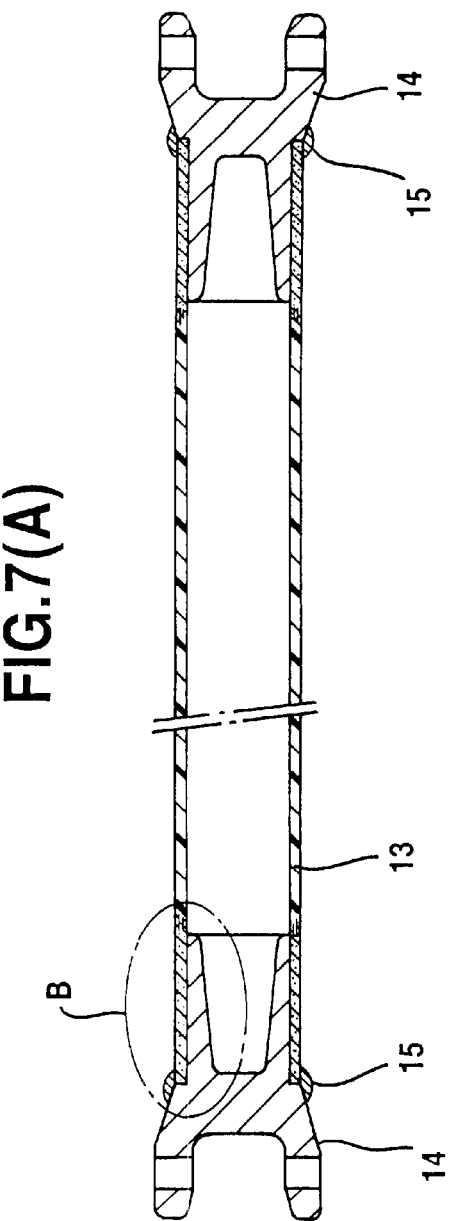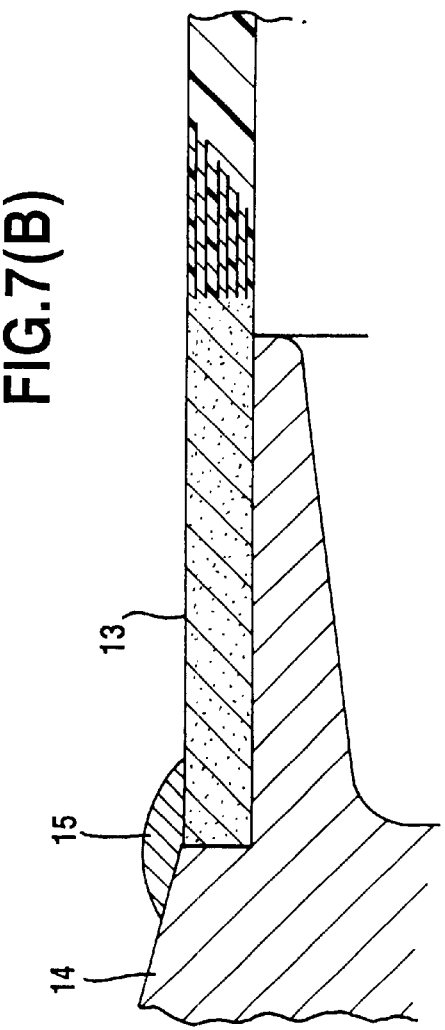

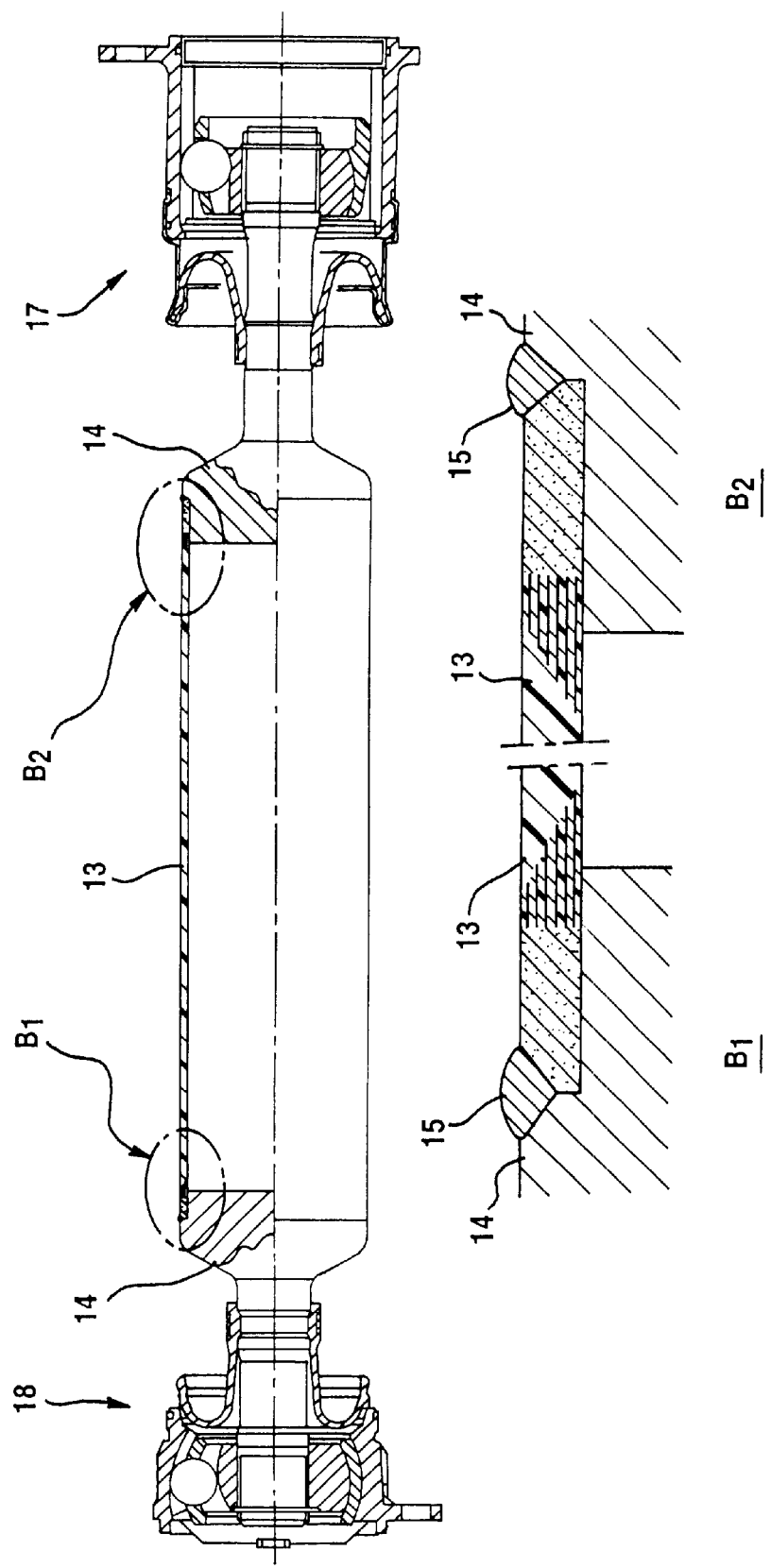

POWER TRANSMISSION SHAFT

BACKGROUND OF THE INVENTION

1. Field of the Invention

The present invention relates to a rotary shaft for transmitting power and more particularly it relates to a power transmission shaft represented by a propeller shaft or drive shaft used as a power transmission shaft for automobiles.

2. Prior Art

The propeller shaft used as the power transmission shaft of an automobile is a propeller shaft for transmitting power from the variable speed gear device to the speed reduction gear device and is connected to them through constant velocity joints installed on the opposite ends thereof, the construction being such as to be capable of accommodating changes in length and angle caused by changes in the relative position between the variable speed gear device and the speed reduction gear device.

As the joints and the intermediate shaft disposed between the joints, which constitute the propeller shaft, it has been common practice to use steel articles. Further, from the viewpoint of bending rigidity, a longer shaft is constructed such that it is split into three or four portions and the intermediate region is supported by a center bearing support. Therefore, it has been required to improve such construction from the viewpoint of weight, cost, etc.

Thus, recently, as exemplified in FIG. 10, it has been proposed to use a hollow shaft made of fiber reinforced plastic (hereinafter referred to as FRP) of high bending rigidity (see Japanese Patent Kokai Hei 3-249429). This change of material from steel to FRP makes it possible not only to achieve weight reduction but to use a longer shaft while making splitting unnecessary and dispensing with the intermediate support bearing, in which respect it becomes possible to reduce weight and cost.

In this connection, in order to secure the strength of the joined portions to realize torque transmission when joining an intermediate shaft of FRP to metal parts at the shaft ends, it has been common practice to make the cross-sectional shape of the shaft ends polygonal, to roughen the contact surfaces as by knurling in the portion where the hollow shaft ends overlap, to crimp the hollow shaft of FRP, or to force a metal part into the core of the hollow shaft, thereby achieving the joining. Further, there are various other means contrived, including applying an adhesive for joining to the contact interface between the FRP hollow shaft end and a metal part, and making use of processing, such as surface roughening, crimping, or press-fitting, combined with an adhesive, so as to retain the joining strength.

With these methods, however, cause problems in an aspect of formation; the processing of the shaft ends becomes difficult, the outer diameter has to be increased in order to secure the strength of the joined portion or axial slip-off preventive measures have to be additionally taken in order to secure reliability. Further, the methods which involve crimping an FRP hollow shaft or press-fitting a metal part into the core of the hollow shaft, entail a decrease in binding force during press fitting due to creep or stress relaxation in the FRP; thus, circumferential slip or axial slip-off sometimes occur, having serious shortcomings including a lack of long-term reliability in the product functions.

When attention is paid to the joined portion, it is seen that it is only through the area of contact between the FRP and the metal part that torque transmission either using the friction force utilizing as the drag the binding force exerted during press-fitting or using the chemical or physical adhesive force of an adhesive applied to the contact interface is effected. In this case, trying to cope with an excessive torque which is impulsively produced, one increases the amount of press fit so as to maximize the area of the contact interface or increases the amount of elastic deformation of the FRP caused by press fitting. During manufacture and processing, however, cracks are produced in the FRP or creep or stress relaxation during use cannot be avoided, thus producing problems in joining.

On the other hand, in the case where a hollow shaft made of FRP is used as an intermediate shaft in a propeller shaft which is a power transmission shaft in order to provide for lightening, low fuel consumption, cost reduction, antivibration, and noise reduction, there is a problem which has to be solved that the outer diameter of the hollow shaft has to be decreased in consideration of the limited space in an automobile.

SUMMARY OF THE INVENTION

The present invention relates to providing a power transmission shaft constructed in such a manner as to ensure realization of appropriate torque transmission under normal load conditions while securing sufficient joining strength against the impulsively exerted excessive torque, and to retain the reliability in the joined portions during long-term use. The present invention provides for a power transmission shaft constructed by the winding of a membrane, film, foil or thin sheet in layers. The power transmission shaft comprises a longitudinal middle portion composed of FRP layers, end portions composed of metal layers, and a transitional portion disposed between the middle portion and each end portion and composed of a composite layer of FRP layers and metal layers. The joining, as by welding, pinning, press-fitting, or friction welding, of metal ports such as joint elements, is effected at the ends or the ends and transitional portions. The ends or the ends and transitional portion secure the strength necessary for joining to joints or the like and enable the joining which can be retained for a long time.

An object of the invention is to provide a power transmission shaft intended to meet the above requirement for improvements, constructed in such a manner as to enable the joining of metal parts to the ends of an FRP hollow shaft to be effected by welding, pinning, press fitting or the like, to ensure realization of appropriate torque transmission under normal load conditions while securing a sufficient joining strength against impulsively exerted excessive torque, and to retain the reliability in the joined portions during long-term use.

As technical means for achieving the object, the present invention provides a power transmission shaft, wherein the longitudinal middle portion is constituted by an FRP laminated structure made of FRP wound into a pipe form, the shaft ends are constituted by a metal laminated structure made of a winding of metal membrane (film), foil or thin sheet, and the transitional portion between the middle portion and the shaft end is constituted by a composite laminated structure in the form of a combination of the FRP laminated structure and metal laminated structure. The shaft ends or the shaft ends and transitional portion secure the strength necessary for joining to joints or the like and enable the joining which can be retained for a long time to be made.

In other words, in the portions adjacent the shaft ends, the shaft comprises, successively from the middle portion toward the shaft ends, a laminated structure of FRP alone, a laminated structure having a combination of FRP and a metal film, and a laminated structure of metal film alone. In the transitional portion having a combination of FRP and metal films, the metal film is bonded to the FRP films as it is sandwiched therebetween and such laminated structures are united in layers, whereby the area of joining is remarkably enlarged. In respect of any of the circumferential and axial components of a force applied to the power transmission shaft, the force can be transmitted with a sufficient enduring strength even if a high shear stress is produced.

Further, since the part associated with the joining at the shaft ends is not a single FRP body, it is possible to effect such a reliable perfect joining method as welding or friction pressure welding for joining a metal laminate and a metal part. For example, in spite of the fact that the FRP uses a plastic material as a matrix even in the transitional portion having a combination of FRP and metal films, its lamination-bonding to the metal films greatly improve creep and stress relaxation characteristics; therefore, even if such joining method as press fitting is employed, such drawbacks as circumferential slippage and axial slip-off will not occur at all and hence the reliability of the joined portion can be retained for a long time.

Further, by arranging the angle of orientation of fibers of the FRP constituting the laminate such that plies of 0°, 90° and ±45° with respect to the axis of the hollow shaft are combined, it is possible to adjust the bending rigidity and torsional rigidity and prevent radial deformation (buckling). At this time, as regards the number of plies, it is also possible to provide a suitable combination to constitute a laminated structure according to the rpm and torque associated with the power transmission shaft (for example, propeller shaft).

In order to increase the critical rpm of the power transmission shaft (for example, propeller shaft) it is desirable that the fibers constituting the lamination be material having a low density and a high modulus of elasticity. Examples of such fibers are PAN type and pitch type carbon fibers, silicon carbide fiber, alumina fiber, boron fiber, glass fiber, para-type aramid (Kevlar) fiber, metal (steel, aluminum alloy, titanium alloy, copper, tungsten) fibers.

For application to (the intermediate shaft in) the propeller shaft, the modulus of elasticity in tension of a fiber is 1,000 kgf/mm$^2$ (9.8 Gpa) or above, preferably 2,000 kgf/mm$^2$ (19.6 Gpa) or above. If it is less than 1, 000 kgf/mm$^2$ (9.8 Gpa), the critical rpm of the propeller shaft cannot be increased, whatever fiber orientation angle of FRP may be arranged.

The strength of a fiber is 100 kgf/mm$^2$ (980 Mpa) or above, preferably 200 kgf/mm$^2$ (1960 Mpa) or above. If it is less than 100 kgf/mm$^2$ (980 Mpa), the structure is insufficient in strength against the torque acting on the propeller shaft, whatever fiber orientation angle of FRP may be arranged.

Two or more of these fibers may be combined for use. Fibers which are high in specific strength and specific modulus of elasticity are effective for weight reduction and suitable for use for the propeller shaft. That is, PAN type carbon fiber is suitable from the viewpoint of specific strength and pitch type carbon fiber is suitable from the viewpoint of specific modulus of elasticity. From the viewpoint of cost reduction, a combination of these carbon fibers or a hybrid combination of these carbon fibers and glass fiber may be used.

These fibers may be in tow form or prepreg form. In the case of tow form, it is formed into a thin-walled large diameter article by the filament winding method while it is immersed in an uncured matrix resin. In the case of prepreg form, it is formed into a thin-walled large diameter article by the pipe rolling method. For the formation of a laminate in which the fiber orientation angle of FRP is arranged using a combination of plies of 0°, 90° and ±45° with respect to the axis of the hollow shaft, the pipe rolling method using prepreg is suitable. With the filament winding method, it is difficult to provide a fiber orientation angle of 0°. The prepreg used in the pipe rolling method is a half-cured sheet of fibers impregnated with thermosetting resin, enabling the disposition of the threads to be maintained in a given direction, a laminating process to be performed in a stabilized manner, and winding to be effected with an optional fiber orientation angle. The fiber sheet to be used herein may be a cloth with threads interlaced in advance at right angles in addition to a given direction.

Thermosetting resins for impregnation as a matrix are not particularly limited. Generally, among usable resins are thermosetting property exhibiting epoxy resin, phenolic resin, unsaturated polyester resin, vinyl ester resin, urethane resin, alkyd resin, xylene resin, melamine resin, silicone resin, and polyimide resin. From the viewpoint of strength, epoxy resin is suitable. When an epoxy resin is used as a matrix, its heat resistance should be not less than 60° C., more preferably not less than 80° C. after the curing of epoxy is used. The atmospheric temperature for the propeller shaft used as a power transmission shaft for an automobile is about 60° C.; therefore, if the heat resistance after the curing of epoxy is less than 60° C., serious problems such as rupture could occur, and it cannot be used as a matrix.

It is possible to use a modified epoxy resin having impact strength imparted thereto by adding rubber particles in the epoxy resin to form an island structure, and another modified epoxy resin whose principal and side chains structurally modified. Further, it is possible to use an epoxy resin having such a filler as electrically conductive carbon black and metal powder dispersed therein to provide electric conductivity. When this resin is used, electric welding, such as spot welding, becomes possible. Further, the interface strength between the matrix and fibers can be improved by surface-activating the surfaces of the fibers to be impregnated by ozonic oxidation treatment or ultraviolet radiation, by improving affinity by wet treatment using a silane coupling agent or titanium coupling agent, or by forming a high reactive functional group site on the fiber surfaces so as to provide firm adhesion having chemical boding after curing with a thermosetting matrix resin.

In the case of forming a laminated structure by using the pipe rolling method, a metal membrane (film), foil or thin sheet to be used on the shaft ends can be wound on a pipe or the like, and there is no particular limitation on the metal so long as it can be put to machining, such as drilling, welding or friction welding. However, preferable examples are iron, aluminum, copper, titanium, and tungsten. Alloys of any of these metals may also be used. Further, the surface of the metal membrane (film), foil or thin sheet used on the shaft ends maybe subjected for surface activation to ozonic oxidation or ultraviolet radiation, or wet-treated with silane coupling agent or titanium coupling agent so as to improve affinity, or may have a highly reactive functional group site formed on the metal surface, providing firm adhesion having a chemical bond with the thermosetting matrix resin after curing, thereby increasing the strength of the interface between the matrix and the metal surface. The surface of the metal membrane (film), foil or thin sheet used on the shaft ends may, in combination with the surface treatment or singly, be subjected to a surface roughening treatment.

Examples of the surface roughening treatment mentioned herein are sand blasting, such physical roughening treatments as drawing, pressing and rolling, and a chemical corrosion treatment using chemicals such as nitric acid and chloric acid.

When a metal membrane, foil or thin sheet is used to form a laminated structure on the shaft ends by the pipe rolling method, an adhesive may be used in clearances between the layers of metal membrane (film), foil or thin sheet to bond them together. The adhesive to be used may be any of all that can be commonly industrially used. However, a film-like hot melt type heat adhesive tape is suitable from winding and post-cure film thickness control aspects. Among this type of heat adhesive tapes are epoxy type, nitrile phenol type and nylon type, but the use is not particularly limited to these types. Further, a solution type adhesive is preferably a structural adhesive consisting of an epoxy type adhesive containing aluminum power or iron oxide powder and enabling resistance welding represented by spot welding. The viscosity of the epoxy type adhesive at this time is preferably 50–10,000 poise (5–1,000 Pa·s). With less than 50 poise (5 Pa·s), the adhesive would sometimes flow out when the metal film is being wound on a mandrel, while with 10,000 poise (1,000 Pa·s) or above, drawbacks occur in processing, including a drawback that uniform application of the adhesive on the metal film is difficult.

When a film-like heat adhesive tape is used, the operation comprises drilling the tape surface, winding the metal membrane (film), foil or thin sheet together with the adhesive tape placed thereon, securing an electric current passage by allowing the layers of metal membrane (film), foil or thin sheet to come in direct contact with each other at the tape openings, forming nuggets by resistance welding represented by spot welding, while achieving the joining by utilizing the adhesion curing due to the welding heat.

BRIEF DESCRIPTION OF THE DRAWINGS

FIG. 7(A) is a longitudinal sectional view of a propeller shaft; FIG. 7(B) is an enlarged view of a portion B in FIG. 7(A);

FIG. 9(A) is a longitudinal sectional view of a propeller shaft; FIG. 9(B) is an enlarged view of portions $B_1$ and $B_2$ in FIG. 9(A)

DESCRIPTION OF THE PREFERRED EMBODIMENTS

A description will now be given of a method of forming, with the pipe rolling method used, a laminated structure (FRP hollow shaft) which comprises, on the opposite sides and successively from the middle toward the shaft ends, (a) a laminated structural region of FRP alone, (b) a region having a construction in which FRP and a metal film are alternately laminated, and (c) a laminated structural region having a metal film alone or a metal film bound by an adhesive.

Figure 2A:
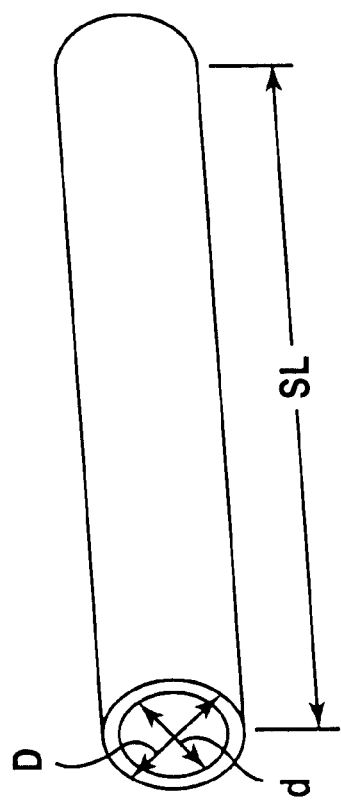
FIG. 2(A) is a perspective view of the power transmission shaft.

As shown in FIG. 2(A), an FRP hollow shaft obtained by using the pipe rolling method has an inner diameter d, an outer diameter D, and a length SL, and let $t_1$ and $t_3$ be the thicknesses of prepreg sheets to be used and $t_2$ and $t_4$ be the thicknesses of metal films. Let PL be the length of the prepreg sheet taken in the winding direction and T=(D−d)/2 be the post-winding thickness.

In the case where the FRP hollow shaft is used as an intermediate shaft in a propeller shaft, the length SL is from 50 mm to 11,000 mm, preferably from 100 mm to 10,000 mm. If the length SL is less than 50 mm, drawbacks occur; for example, a composite prepreg sheet of FRP prepreg and metal film to be later described cannot be satisfactorily wound on a mandrel (FIG. 2(B)), and if it is greater than 11,000 mm, installation of the shaft in a vehicle even when used in a truck, automobile or other vehicle will become difficult.

The outer diameter D of the FRP hollow shaft is from 10 mm to 250 mm, preferably from 15 mm to 230 mm, and more preferably 20 mm to 200 mm. If the outer diameter D is less than 10 mm, the shaft would not provide satisfactory torque transmission as a propeller shaft to be used in an automobile, while if it is greater than 250 mm, this would cause problems as to space, such as interference with other parts in the automobile. The post-winding wall thickness T of the FRP hollow shaft may be from 0.3 mm to 30 mm, preferably from 0.5 mm to 25 mm. If the wall thickness T is less than 0.3 mm, the shaft would not provide satisfactory torque transmission as a propeller shaft to be used in an automobile, while if it is greater than 30 mm, this would cause problems, such as the curing time of the matrix thermosetting resin in the FRP prepreg being increased, which, in turn, increases the manufacturing cost.

Figure 5A:
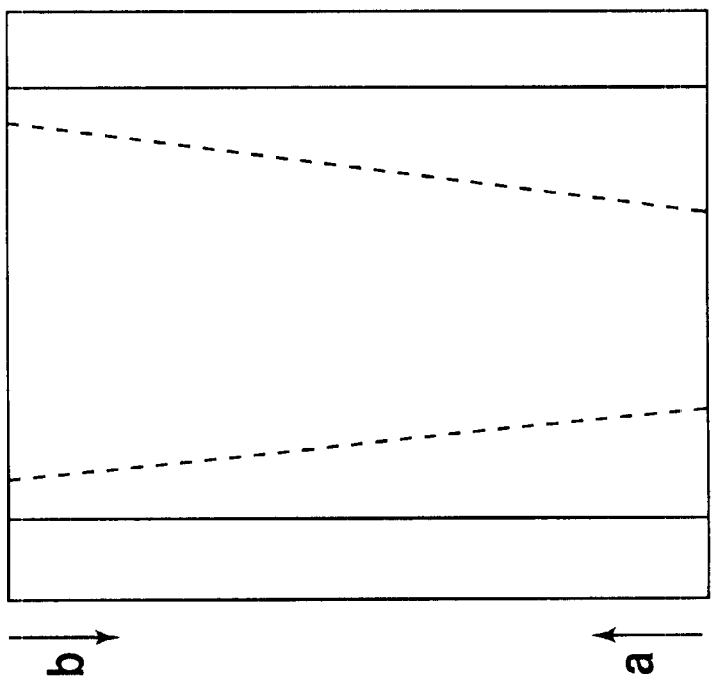
FIG. 5(A) and FIG. 5(B) are front views of superposed prepreg sheets.
Figure 5B:
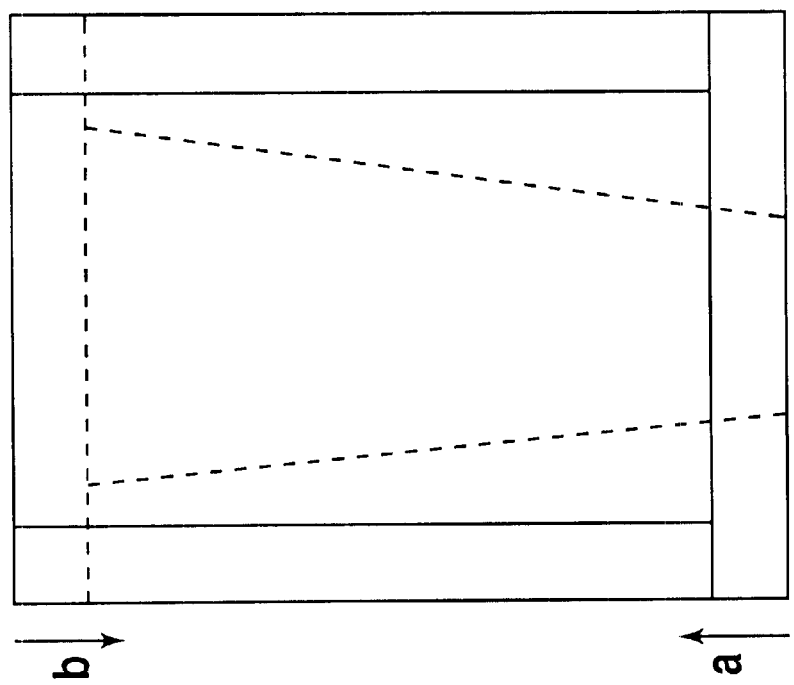

FIG. 5(A) and FIG. 5(B) show the basic construction of a prepreg sheet to be used. In addition, the FRP hollow shaft to be obtained by using this prepreg sheet comprises, on the opposite ends and successively from the middle toward the sheet ends, (a) a laminated structural region of FRP alone, (b) a region having a construction in which FRP and a metal film are alternately laminated, and (c) a laminated structural region having a metal film alone or a metal film bound by an adhesive.

Figure 3A:
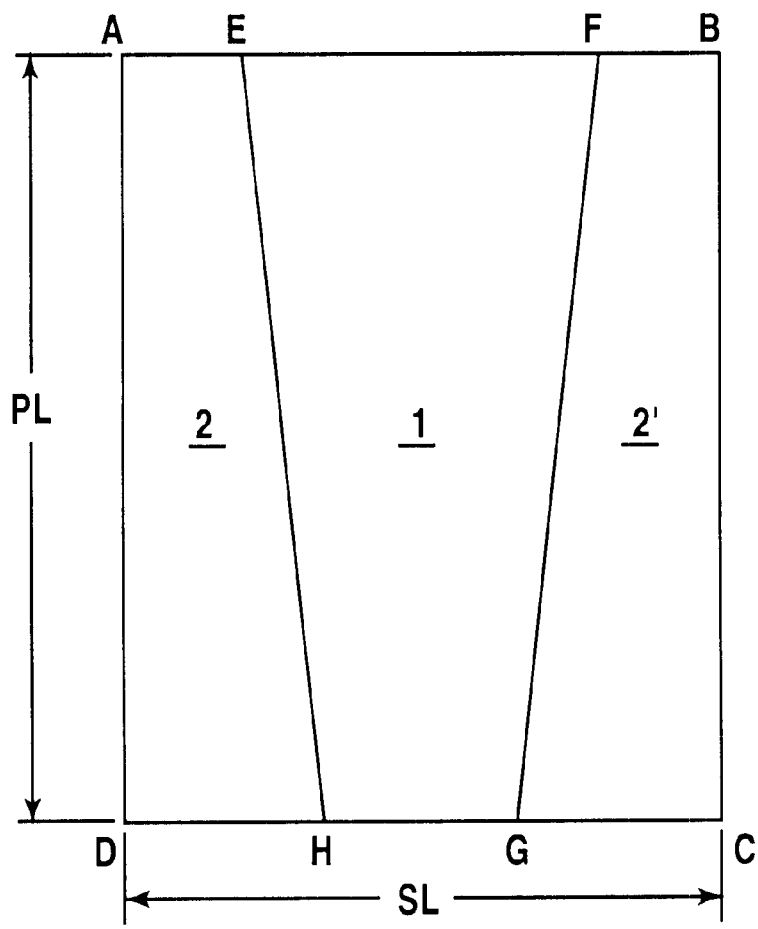
FIG. 3(A) is a front view of a prepreg sheet.
Figure 3B:
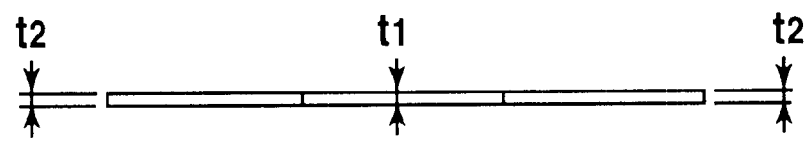
FIG. 3(B) is a bottom view of the sheet shown in FIG. 3(A)

First of all, as shown in FIG. 3(A), a prepreg sheet (ABCD) is prepared in which a trapezoidal (EFGH) FRP prepreg sheet 1 is interposed between trapezoidal (AEHD, FBCG) metal films 2, 2' in edge to edge relation. Let PL be the length (AD or BC) of the sheet taken in the winding direction and SL be the width (AB or CD) of the sheet. As shown in FIG. 3(B), the thickness of the FRP prepreg sheet 1 is $t_1$ and the thickness of the metal film 2 is $t_2$.

Figure 4A:
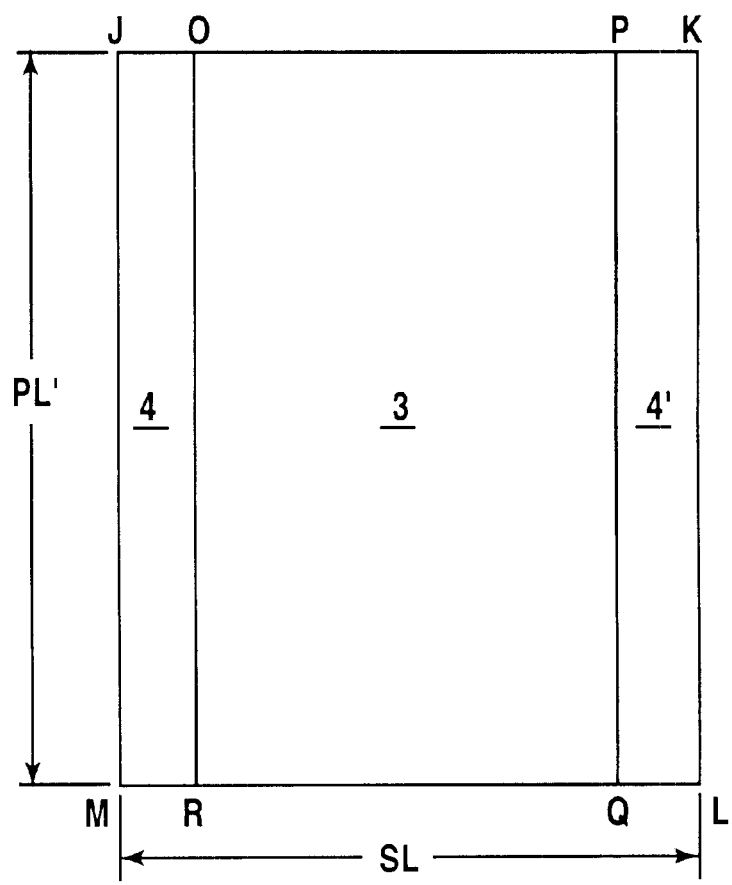
FIG. 4(A) is a front view of a prepreg sheet.
Figure 4B:
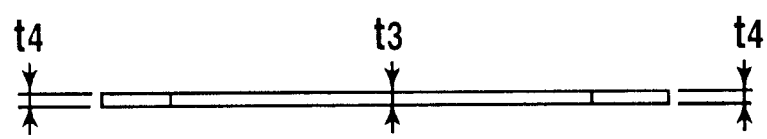
FIG. 4(B) is a bottom view of the sheet shown in FIG. 4(A)

Similarly, as shown in FIG. 4(A), a prepreg sheet (JKLM) is prepared in which a rectangular (OPQR) FRP prepreg sheet 3 is interposed between rectangular (JORM, PKLQ) metal films 4 and 4' in edge to edge relation. Let PL' be the length (JM or KL) of the sheet taken in the winding direction and SL be the width (JM or LM) of the sheet. As shown in FIG. 4(B), the thickness of the FRP prepreg sheet 3 is $t_3$ and the thickness of the metal film 4 is $t_4$.

Figure 1A:
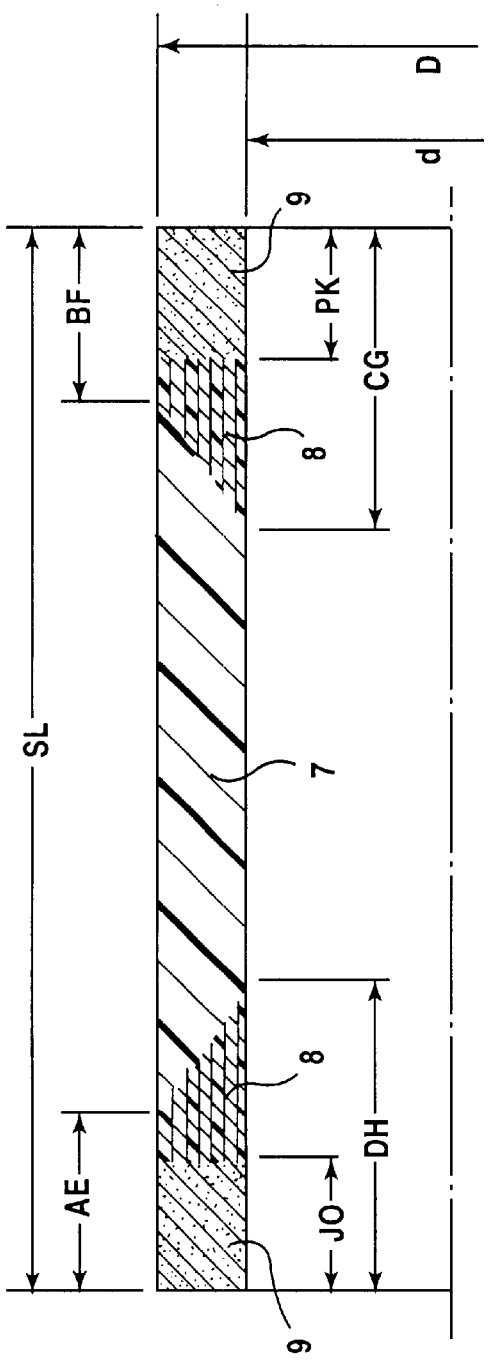
FIG. 1(A) and FIG. 1(B) are half sectional views of a power transmission shaft illustrating the concept of the present invention.
Figure 1B:
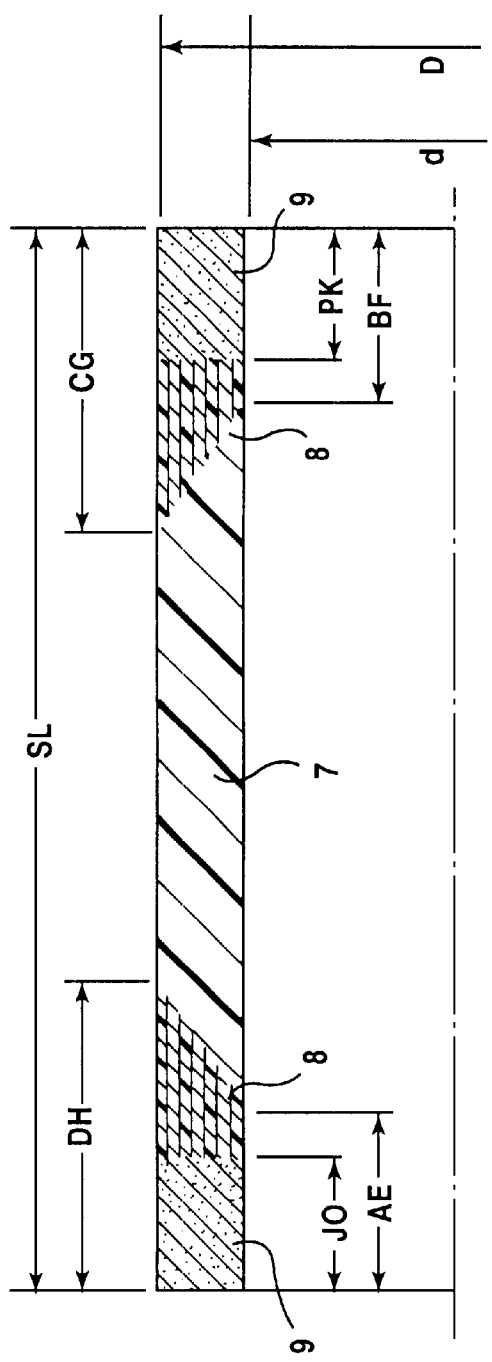

And as shown in FIG. 5(A), the prepreg sheet (JKL'M) of FIG. 4(A) and FIG. 4(B) is placed on the prepreg sheet (ABCD) of FIG. 3(A) and FIG. 3(B) to form a single composite prepreg sheet. Clearly, the thickness of the prepreg portion is $t_1+t_3$ and the thickness of the metal film portion is $t_2+t_4$. This composite prepreg sheet is wound on a mandrel (5; FIG. 1(B)) in the direction of arrow a or b shown in FIG. 5(A).

In the rectangular shape (ABCD) of FIG. 3(A), there are relations such that AB=CD=SL, AD=BC=PL, AB=AE+BF+EF, and CD=DH+CG+GH. Further, AE and DH, and BF and CG are set in the following relation.

10 mm<AE≦DH and 10 mm<DH<SL/2

10 mm<BF≦CG and 10 mm<CG<SL/2.

Further, let n be the number of turns of the composite prepreg sheet on a mandrel and d be the outer diameter of the mandrel (which is equal to the inner diameter of the FRP hollow shaft) Then, the relation PL≈ndπ holds.

In the rectangular shape (JKLM) of FIG. 4(A), there are relations such that JM=JO+KP+OP, and LM=MR+LQ+QR. Further, JO and MR, and KP and LQ are set in the following relation.

10 mm<JO≈MR≦AE<<SL/2

10 mm<KP≈LQ≦BF<<SL/2.

Then, PL' and PL are related such that PL'≦PL or PL'≧PL, JO and OP are related such that JO≦OP or JO≧OP, and MR and QR are related such that MR≦QR or MR≧QR.

In the composite prepreg sheet (FIG. 5(A)) obtained by superposing the rectangular shapes ABCD and JKLM of FIGS. 3(A) and 3(B) and FIGS. 4(A) and 4(B), a region where a metal film alone is wound (9; FIGS. 1(A) and 1(B)) is formed on each end of the FRP hollow shaft in that metal films in the trapezoidal shape AEHD and rectangular shape JORM are wound in superposed relation and in that metal films in the trapezoidal shape FBCG and rectangular shape PKLQ are wound in superposed relation, it being preferable that the length of the region be from 10 mm to less than SL/2. If the length of this region is less than 10 mm, even if joining by press-fitting, or joining by drilling or other machining, welding or friction welding is employed, this would not provide joining which is reliable for a long term. Further, if it is greater than SL/2, this results in more than half of the FRP hollow shaft being a metal portion, sometimes spoiling the effect of weight reduction.

The thickness $t_2$ of the metal films 2, 2' of the trapezoidal shapes AEHD and FBCG to be used may be equal or unequal to the thickness $t_4$ of the metal films 4, 4' of the rectangular shapes JORM and PKLQ, the thickness $t_2$ or $t_4$ being from 1 μm to 300 μm, preferably from 10 μm to 250 μm, more preferably from 15 μm to 200 μm. If the metal film thickness is less than 1 μm, the metal film would be liable to wrinkle when wound on the mandrel, while if it is greater than 300 μm, the metal film could sometimes not be wound.

The thickness $t_1$ of the FRP prepreg sheet 1 of the trapezoidal shape EFGH to be used may be equal or unequal to the thickness $t_3$ of the FRP prepreg sheet 3 of the rectangular shape OPQR, the thickness $t_1$ or $t_3$ being from 5 μm to 300 μm, preferably from 10 μm to 280 μm, more preferably from 15 μm to 250 μm. If the FRP prepreg sheet thickness is less than 5 μm, the FRP prepreg sheet would be liable to wrinkle or break when wound on the mandrel, while if it is greater than 300 μm, a composite prepreg sheet, when formed, would be too thick to allow easy winding.

In order to reduce the level difference which is produced when such composite prepreg sheet is wound on a mandrel, the sheets of FIGS. 3(A) and 3(B) and FIGS. 4(A) and 4(B) may be superposed in shifted relation as shown in FIG. 5(B). Alternatively, the sheets of FIGS. 3(A) and 3(B) and FIGS. 4(A) and 4(B) may be so formed that their lengths in the winding direction differ (PL≠PL'), so that they may be superposed as they are shifted at the winding starting end.

Winding in the direction of arrow a shown in FIG. 5(A) and FIG. 5(B) provides a laminated structure consisting of a FRP prepreg sheet and a metal film and having a section shown in FIG. 1(A), while winding in the direction of arrow b shown in FIG. 5(A) and FIG. 5(B) provides a laminated structure consisting of a FRP prepreg sheet and a metal film and having a section shown in FIG. 1(B).

Subsequently, the outer surface of this laminated structure is wrapped with a heat-shrinkable tape or subjected to a vacuum using a vacuum bag. This is for the purpose of temporarily holding the prepreg sheet to prevent pre-cure unwinding or for prevention of formation of gas layers or voids in the laminated structure during curing. If a laminated structure which contains gas layers or voids after curing is used as an intermediate shaft in a propeller shaft, the gas layers or voids would sometimes act as starting points for damage under load of torque during the service life of the shaft, considerably lowering the durability Strength. The laminated structure thus formed is treated under curing conditions (for example, heat treatment) for the matrix thermosetting resin of the FRP prepreg and then the mandrel is extracted, whereby an intended laminated structure, i.e., an FRP shaft, cured and formed, which comprises, on the opposite ends and successively from the middle toward the shaft ends, (a) a laminated structural region of FRP alone, (b) a region having a construction in which FRP and a metal film are alternately laminated, and (c) a laminated structural region having a metal film alone or a metal film bound by an adhesive.

Formation of a laminated structural region having a metal film bound by an adhesive can be attained, for example, by applying an adhesive to the upper surface of the metal films 4, 4' of FIG. 4(A) or by winding the adhesive films.

In the laminated structure in the region of the transitional portion 8 in FIG. 1(A) and FIG. 1(B), a large bonding area can be obtained since the matrix thermosetting resin of the FRP prepreg, which is sandwiched such that it is placed on the upper and lower sides of a metal film, is cured.

Further, (a) a laminated structural region of FRP alone (central portion 7), (b) a region having a construction in which FRP and a metal film are alternately laminated (transitional portion 8), and (c) a laminated structural region having a metal film bound by an adhesive (end portion 9), differ in rigidity; if arranged in the order of magnitude of rigidity, they are c) >b) >a). Therefore, when a high torsional torque, for example, acts, the region of stress concentration, in the axial section of the hollow shaft, is (b) the region (transitional portion 8) having a construction in which FRP and a metal film are alternately laminated, (FIG. 1(A) and FIG. 1(B)). That is, the stress concentrates on the enveloping surface, or in the vicinity thereof, formed by the front end of the metal film of the (DH-AE) or (CG-BF) in FIG. 1(A) and FIG. 1(B). This stress concentration region can be enlarged for reducing the maximum stress value by increasing the dimensional difference between the AE and DH or BF and CG or by increasing the number of turns to increase the wall thickness of the FRP shaft. Such dimensional difference or wall thickness is designed according to the size of the torsional torque loaded on the propeller shaft.

In the aspect of creep characteristics and stress relaxation characteristics (which are desired to be small), the c) and b) regions are superior. For example, in the joining at the shaft ends using this laminated structure for the intermediate shaft in the propeller shaft, long-term reliability can be obtained even if a joining method, such as press-fitting, is used in the c) and b) regions. In this respect, the a) region is inferior in creep and stress relaxation characteristics to the c) and b) regions. If a joining method, such as press-fitting, is effected in this region, practical long-term reliability of the product cannot be obtained, thus requiring additional use, for example, of an adhesive. Particularly in the c) region having a laminated structure using a metal film alone, it is possible to employ a joining method, such as welding or friction welding, which has provided good results from the viewpoint of reliability, in the joining of metal parts.

Further, in the laminated structural region having a metal film bound by an adhesive, it is possible to employ as a joining method the resistance welding represented by the spot welding using as an adhesive a structural epoxy resin which is rendered electrically conductive by having dispersed therein a filler such as electrically conductive carbon black or metal powder such as aluminum powder or iron oxide powder. At this time, when a film-like heat adhesive tape is used as an adhesive, it is perforated and superposed on the metal films, the resulting assembly being wound, the passage of electricity being secured in that metal films directly contact each other through perforations. Thus, joining may be effected by forming nuggets by resistance welding represented by spot welding.

Further, in an FRP shaft having a laminated structure of N plies, when FRP prepreg sheets whose fibers orientation angles with respect to the axis of the hollow shaft are 0°, 90° and ±45°, respectively, are to be wound n1 plies, n2 plies, and n3 plies (N=n1+n2+n3), respectively, this can be attained in such a manner that FRP prepreg sheets (see 10, 11, 12 in FIG. 6) having lengths (see $PL_1$, $PL_2$, $PL_3$ in FIG. 6) corresponding to n1, n2, and n3, respectively, and having fiber orientation angles 0°, 90°, and ±45° with respect to the axis of the hollow shaft in the winding-corresponding areas in the region 1 in FIG. 3(A) or the region 3 in FIG. 4(A) are arranged in advance and wound on a mandrel 5, whereby an FRP shaft having the intended laminated construction can be obtained.

Further, from the viewpoint of cost reduction, prepreg sheets of different materials, such as carbon fiber prepreg and glass fiber prepreg, may be combined to provide an FRP prepreg sheet to be disposed in the region 1 in FIG. 3(A) or region 3 in FIG. 4(A), whereby a FRP shaft in which more inexpensive FRP of different materials are laminated can be obtained.

FIG. 7(A) shows an example of the arrangement of a propeller shaft using an FRP shaft according to the invention as an intermediate shaft 13 having joint elements 14 at its opposite ends. As shown in FIG. 7(B), the metal layers (9 in FIG. 1 (A) and FIG. 1(B)) at an end of the intermediate shaft 13 and the joint element 14 of metal are permanently joined by welding at a position shown at 15.

Figures 8A, 8B:
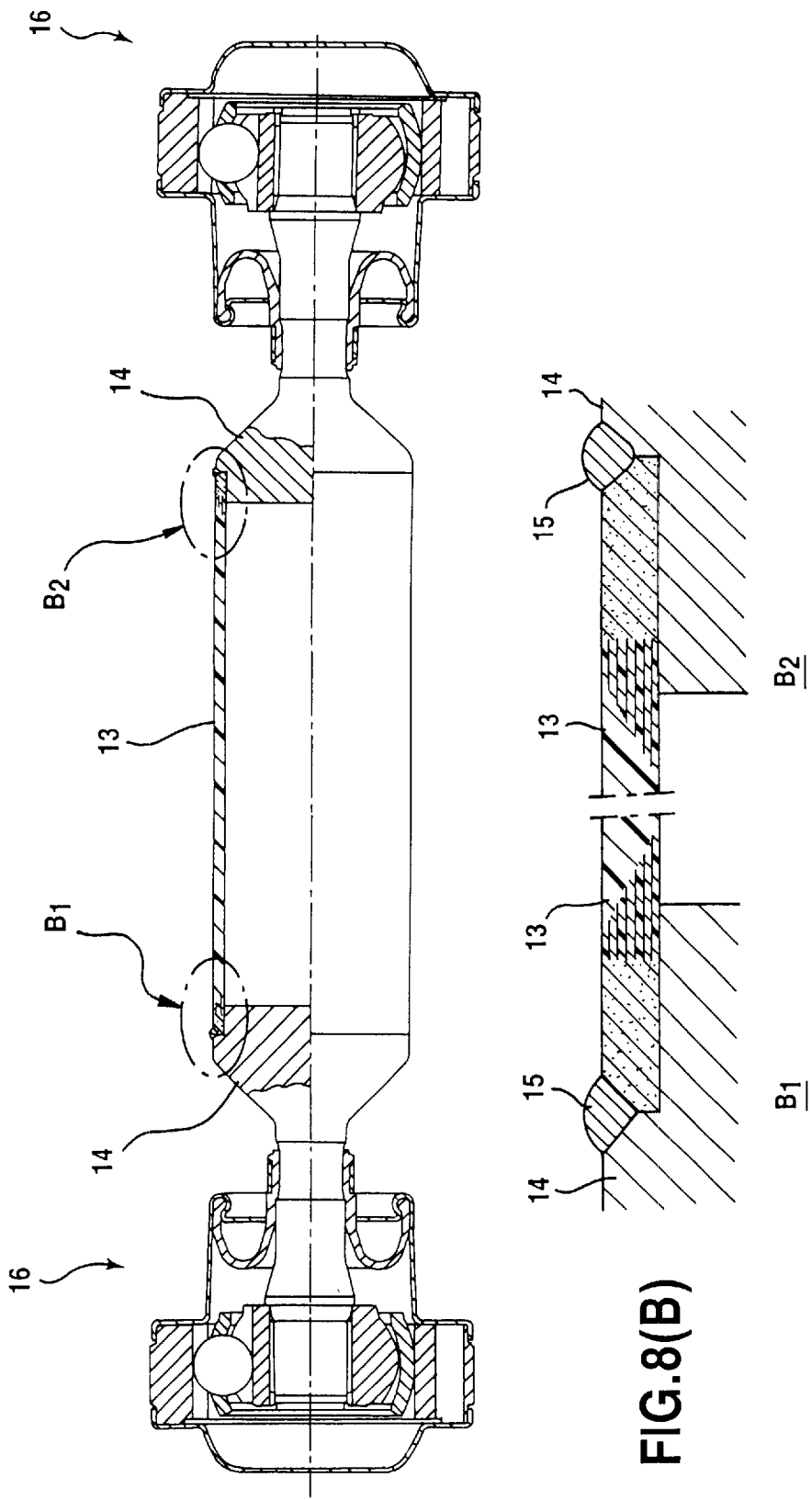
FIG. 8(A) is a longitudinal sectional view of a propeller shaft.
FIG. 8(B) is an enlarged view of portions $B_1$ and $B_2$ in FIG. 8(A)
Figure 10:
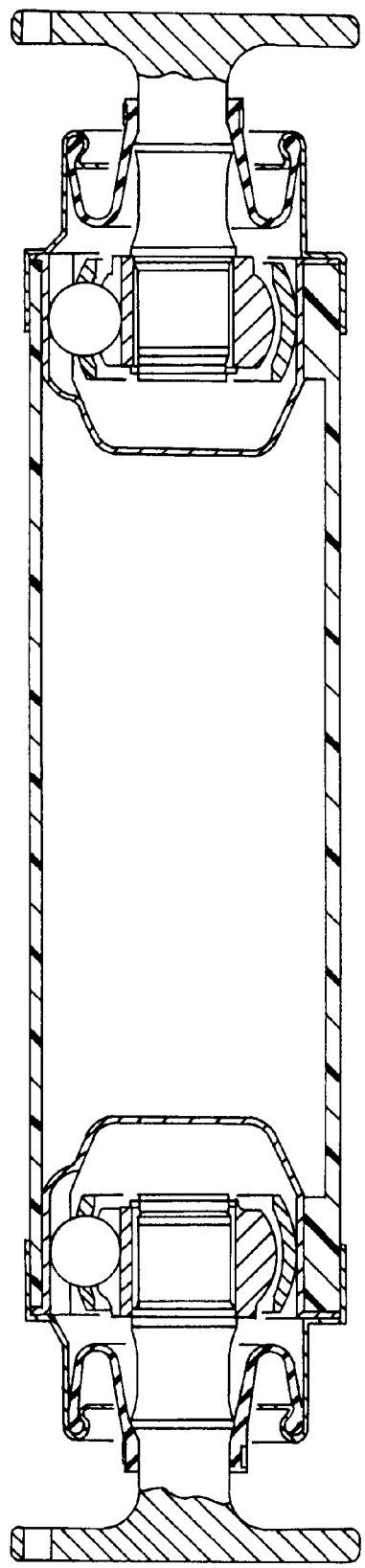
FIG. 10 is a longitudinal sectional view of a propeller shaft illustrating the prior art.

As another embodiment, FIG. 8(A) and FIG. 8(B) show an automobile propeller shaft having cross groove type constant velocity joints 16 attached to the opposite ends of the intermediate shaft 13. FIG. 9 (A) and FIG. 9 (B) show an automobile propeller shaft having a slidable double offset type constant velocity joint 17 and a fixed bar field type constant velocity joint 18 attached to the opposite ends of the intermediate shaft 13. In each case, the metal layers (9 in FIG. 1(A) and FIG. 1(B)) at the ends of the intermediate shaft 13 and the metal joint elements 14, which herein are stub shafts, are permanently joined by welding at positions shown at 15.

A description will now be given of embodiments applied to propeller shafts which are power transmission shafts for automobiles so as to achieve weight reduction, cost reduction, low fuel consumption, and improvement in vibration and noise characteristic. However, the present invention is not limited thereto.

Embodiment 1

Figure 2B:
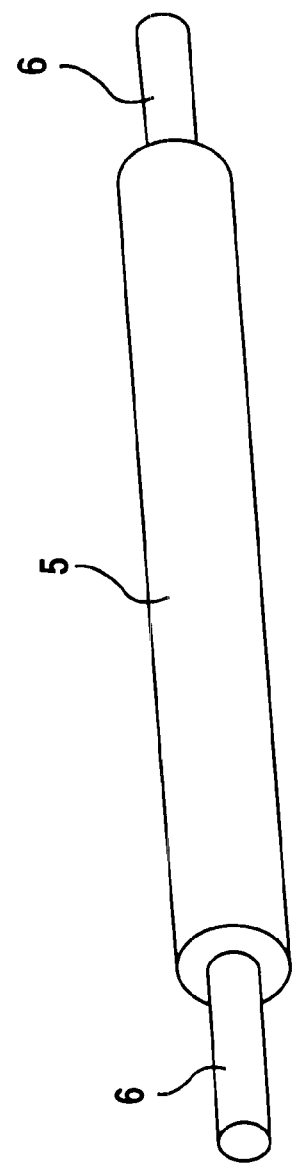
FIG. 2(B) is a perspective view of a mandrel.

An FRP hollow shaft having a shape shown in FIG. 2(A) was fabricated in such a manner that a mold release agent was applied to a cylindrical mandrel 5 shown in FIG. 2(B) and then a composite prepreg sheet using a metal film and PAN type carbon fiber prepreg of epoxy resin matrix to be later described was wound by the pipe rolling method. The mandrel 5 is 76 mm in diameter and 1,500 mm in length and has 150-mm long chucking shafts 6 at the opposite ends. In addition, the FRP hollow shaft of this embodiment was fabricated by winding 6 plies, 6 plies and 8 plies of FRPs whose fiber orientation angles with respect to the axis of the hollow shaft were 0°, 90° and ±45°, respectively.

The dimensions in FIGS. 2(A), 3(A), 3(B), 4(A) and 4(B) were set as follows.

Outer diameter of hollow shaft, D: 80 mm
Inner diameter of hollow shaft, d: 76 mm
Wall thickness of hollow shaft, T: 2 mm
Length of hollow shaft, SL: 1,300 mm
Length of prepreg sheet, PL: 2,400 mm
Length of prepreg sheet, PL': 2,400 mm
In the trapezoidal prepreg sheet EFGH 1,
EF=960 mm
GH=900 mm
In the trapezoidal or rectangular prepreg sheet OPQR 3,
OP=1,040 mm
QR=1,040 mm The thicknesses of the carbon fiber prepreg sheets used for the trapezoidal prepreg sheets EFGH 1 and OPQR 3 are each 0.1 mm.

Figure 6:
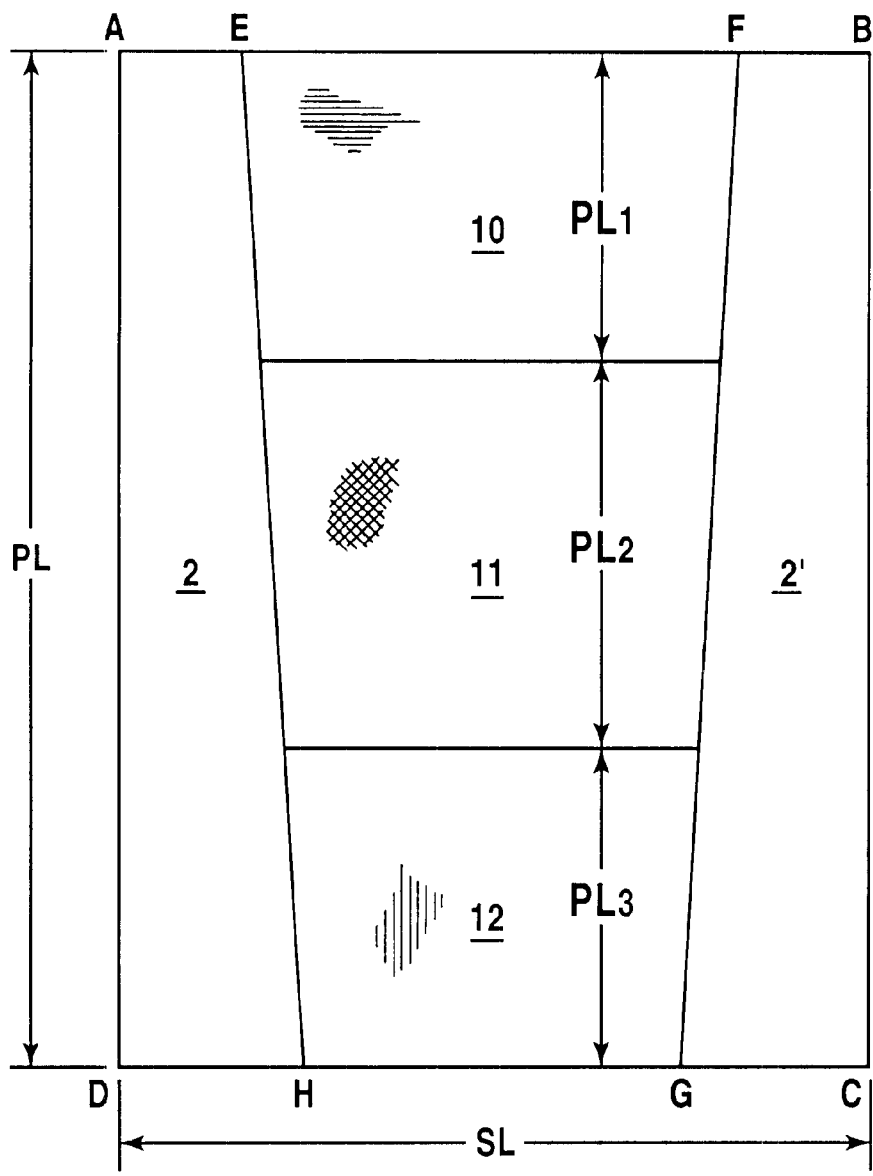
FIG. 6 as a front view of a prepreg sheet.

In the trapezoidal prepreg sheet EFGH 1 shown in FIG. 3(A), prepreg sheets whose fiber orientation angles with respect to the axis of the hollow shaft were 0°, ±45° and 90°, respectively, were arranged, from the side EF, to extend 720 mm, 960 mm and 720 mm, respectively (FIG. 6). Similarly, in the rectangular prepreg sheet OPQR 3 shown in FIG. 4(A), prepreg sheets whose fiber orientation angles with respect to the axis of the hollow shaft were 0°, ±45° and 90°, respectively, were arranged, from the side OP, to extend 720 mm, 960 mm and 720 mm, respectively.

The dimensions of the metal films used are as follows.
In the metal film sheet AEHD 2,
AE=170 mm
HD=200 mm
AD=2,400 mm
In the metal film sheet FBCG 2',
FB=170 mm
CG=200 mm
BC=2,400 mm The thicknesses of the metal film sheets AEHD and FBCG 2 and 2' are each 0.1 mm.

In the metal film sheet JORM 4,
JO=130 mm
RM=130 mm
JM=2,400 mm
In the metal film sheet PKLQ 4',
PK=130 mm
LQ=130 mm
ML=2,400 mm The thicknesses of the metal film sheets JORM and PKLQ 4 and 4' are each 0.09 mm. In addition, a rolled iron film was used for the metal film. Epoxy type structural adhesive WELD BOND (trade name, produced by Sunstar Giken co. ltd.) was applied to the surfaces of these iron film sheets JORM and PKLQ 4 and 4'.

These prepreg and metal film sheets were arranged as shown in FIGS. 3(A) and 3(B) and FIGS. 4(A) and 4(B) and superposed to provide a composite sheet as shown in FIG. 5(A). This composite sheet was wound from the lower side in FIG. 5(A) on the mandrel 5 shown in FIG. 2(B) and then a heat-shrinkable film was wound thereon, the assembly being heated at 150° C. for 2 hours and cured. After curing, the unnecessary portions at the opposite ends were cut off, and an FRP hollow shaft (FIG. 2(A)) was obtained after removal from the mandrel 5. This FRP hollow shaft is constructed by winding 6 plies, 6 plies and 8 plies (6+6+8=20) of FRP sheets whose fiber orientation angles with respect to the axis of the hollow shaft are 0°, 90° and ±45°, respectively.

The sectional construction of the hollow shaft is schematically shown in FIG. 1(A) and FIG. 1(B). The longitudinal middle portion 7 is a laminated structural region of FRP alone, the thicknesses, as seen radially outward, being 0.6 mm, 0.6 mm and 0.8 mm for fiber orientation angles of 90°, ±45° and 0°, respectively. The transitional portions 8 extending from a position spaced 13 cm from the shaft end to a position spaced 20 cm therefrom are regions including construction in which FRP and metal film sheets are alternately laminated. The end portions 9 extending 13 cm from the shaft end are laminated structural regions in which metal film is bound by an adhesive.

Joint elements of metal were press-fitted 100-mm deep into the opposite ends of the hollow shaft thus obtained, and then the ends of the hollow shaft were welded to produce a propeller shaft. Evaluation of the strength and durability of the shaft was made by static torsional test and torsional fatigue test. As to static torsional strength, a judgment as being acceptable was made when a torque from the torque level loaded on automobile propeller shafts to 150 kg·m or above was successfully applied. For torsional fatigue test, a torsional torque of 150 kg·m was applied 500 thousand times in a swing mode to observe the state after the fatigue test.

The results obtained are shown in tables 1 and 2. In addition, the tables 1 and 2 result from dividing a single table along a dot-dash line. As to the static torsional strength, the middle portion of the shaft broke under a torque of 400 kg·m. As to the torsional fatigue test, there was no abnormality observed in the joined portions and shaft portion even when a torsional torque of 150 kg·m was applied 500 thousand times.

TABLE 1

| Embodiment No. | RFP prepreg sheet | | Metal film | | Kind of adhesive | AE (=FB) mm | HD (CG) mm |
|---|---|---|---|---|---|---|---|
| | Kind of fiber | Thickness μm | Kind | Thickness μm | | | |
| 1 | Note 1) CFRP (PAN type) | 100 | Note 4) Fe | 100 | Note 6) epoxy type (solution) | 170 | 200 |
| 2 | ↑ | 200 | ↑ | 200 | ↑ | ↑ | ↑ |
| 3 | ↑ | 50 | ↑ | 50 | ↑ | ↑ | ↑ |
| 4 | ↑ | 100 | ↑ | 100 | ↑ | ↑ | 170 |
| 5 | ↑ | ↑ | ↑ | ↑ | ↑ | ↑ | 250 |
| 6 | ↑ | ↑ | ↑ | ↑ | None | ↑ | 200 |

TABLE 2

| JO (=PK) mm | PL (=PL') mm | Number of turns n ply ① = 0° ② = ±45° ③ = 90° | Joining method | Results of evaluation | |
|---|---|---|---|---|---|
| | | | | Static torsional strength kg·m (Broken places) | State of joined portions after torsional fatigue test |
| 130 | 2,400 | 20 ① 6 ② 8 ③ 6 | Welding | Acceptable 400 (central region) | Acceptable: There is no abnormality in joined portions |
| ↑ | 1,200 | 10 ① 3 ② 4 ③ 3 | ↑ | Acceptable 380 (central region) | Acceptable: There is no abnormality in joined portions. |
| ↑ | 4,800 | 40 ① 12 ② 16 ③ 12 | ↑ | Acceptable 450 (central region) | Acceptable: There is no abnormality in joined portions. |
| ↑ | 2,400 | 20 ① 6 ② 8 ③ 6 | ↑ | Acceptable 300 (AE, HD central side) | Acceptable: There is no abnormality in joined portions. |
| ↑ | ↑ | ↑ | ↑ | Acceptable 400 (central region) | Acceptable: There is no abnormality in joined portions. |
| ↑ | ↑ | ↑ | ↑ | Acceptable 390 (central region) | Acceptable: There is no abnormality in joined portions. |

Tables 3 and 4 and tables 5 and 6 show the results of evaluation of the strength and durability of propeller shafts (embodiments 2 through 18) made by static torsional test and torsional fatigue test which propellor shafts were FRP hollow shafts produced by changing the kinds of fiber and metal film, thickness, kind of adhesive, size of metal film, and the number of turns of composite prepreg sheet, the method of joining metal joint elements being also changed. In each case, the propeller shafts passed the static torsional test and torsional fatigue test. In addition, the tables 3 and 4, and tables 5 and 6, when put together, form single tables, respectively.

TABLE 3

| Embodiment No. | RFP prepreg sheet | | Metal film | | | AE (=FB) mm | HD (CG) mm |
|---|---|---|---|---|---|---|---|
| | Kind of fiber | Thickness μm | Kind | Thickness μm | Kind of adhesive | | |
| 7 | CFRP (PAN type) | 100 | Fe | 100 | Epoxy type solution) | 170 | 200 |
| 8 | ↑ | ↑ | ↑ | ↑ | Note 7) nitrile phenol type (film) | ↑ | ↑ |
| 9 | ↑ | ↑ | Note 5) Al | ↑ | Note 8) Epoxy type (film) | ↑ | ↑ |
| 10 | ↑ | 200 | ↑ | 200 | Epoxy type (film) | ↑ | ↑ |
| 11 | Note 2) CFRP (pitch type) | 100 | ↑ | 100 | Nitrile phenol type (film) | ↑ | ↑ |
| 12 | ↑ | ↑ | Fe | ↑ | Epoxy type (solution) | ↑ | ↑ |

TABLE 4

| JO (=PK) mm | PL (=PL') mm | Number of turns n ply ①=0° ②=±45° ③=90° | Joining method | Results of evaluation | |
|---|---|---|---|---|---|
| | | | | Static torsional strength kg · m (Broken places) | State of joined portions after torsional fatigue test |
| 130 | 2,400 | 20 | Press-fit | Acceptable 390 (central region) | Acceptable: There is no abnormality in joined portions |
| ↑ | ↑ | ① 6 ② 8 ③ 6 | Depth of press-fit: 100 mm | Acceptable 380 (central region) | Acceptable: There is no abnormality in joined portions. |
| ↑ | ↑ | ↑ | ↑ | Acceptable 380 (central region) | Acceptable: There is no abnormality in joined portions. |
| ↑ | ↑ | 10 | ↑ | Acceptable 370 (central region) | Acceptable: There is no abnormality in joined portions |
| ↑ | 2,400 | ① 3 ② 4 ③ 3 20 | ↑ | Acceptable 340 (central region) | Acceptable: There is no abnormality in joined portions |
| ↑ | ↑ | ① 6 ② 8 ③ 6 | Welding | Acceptable 340 (central region) | Acceptable: There is no abnormality in joined portions. |

TABLE 5

| Embodiment No. | RFP prepreg sheet Kind of fiber | RFP prepreg sheet Thickness μm | Metal film Kind | Metal film Thickness μm | Kind of adhesive | AE (=FB) mm | HD (CG) mm |
|---|---|---|---|---|---|---|---|
| 13 | Note 3) GFRP | 100 | Fe | 100 | Epoxy type (solution) | 170 | 200 |
| 14 | ↑ | ↑ | ↑ | ↑ | ↑ | ↑ | ↑ |
| 15 | ↑ | ↑ | ↑ | ↑ | Note 9) Epoxy type (film) | ↑ | ↑ |
| 16 | ↑ | ↑ | Al | ↑ | Epoxy type (solution) | ↑ | ↑ |
| 17 | ' | 200 | ↑ | 200 | Epoxy type (film) | ↑ | ↑ |
| 18 | CFRP (PAN type) | 100 | Fe | 100 | Note 9) Nitrile phenol type (film) | ↑ | ↑ |

TABLE 6

| JO (=PK) mm | PL (=PL') mm | Number of turns n ply ①=0° ②=±45° ③=90° | Joining method | Results of evaluation Static torsional strength kg·m (Broken places) | State of joined portions after torsional fatigue test |
|---|---|---|---|---|---|
| 130 | 2,400 | 20 | Welding | Acceptable 320 (central region) | Acceptable: There is no abnormality in joined portions |
|  |  | ① 6 ② 8 ③ 6 |  |  |  |
| ↑ | ↑ | ↑ | Press-fit Depth of press-fit: 100 mm | Acceptable 310 (central region) | Acceptable: There is no abnormality in joined portions. |
| ↑ | ↑ | ↑ | Welding | Acceptable 310 (central region) | Acceptable: There is no abnormality in joined portions. |
| ↑ | ↑ | ↑ | Press-fit Depth of press-fit: 100 mm | Acceptable 310 (central region) | Acceptable: There is no abnormality in joined portions. |
| ↑ | 1,200 | 10 | ↑ | Acceptable 290 (central region) | Acceptable: There is no abnormality in joined portions |
|  |  | ① 3 ② 4 ③ 3 |  |  |  |
| ↑ | 2,400 | 20 | Welding | Acceptable 380 (central region) | Acceptable: There is no abnormality in joined portions |
|  |  | ① 6 ② 8 ③ 6 |  |  |  |

For comparison, tables 7 and 8 show the results of evaluation of strength and durability of propeller shafts (comparative examples 1 through 4) made by static torsional test and torsional fatigue test which propeller shafts were hollow shafts of FRP laminated construction alone having metal joint elements joined thereto by press-fit and by welding. In each case, they failed the static torsional test and the torsional fatigue test. In particular, since the joining of the hollow shafts of FRP laminated construction alone and metal joint elements by welding could not be established, propeller shafts could not be produced (comparative examples 2 and 4).

TABLE 7

| Embodiment No. | RFP prepreg sheet | | Metal film | | Kind of adhesive | AE (=FB) mm | HD (CG) mm |
|---|---|---|---|---|---|---|---|
| | Kind of fiber | Thickness μm | Kind | Thickness μm | | | |
| 1 | CFRP (PAN type) | 100 | — | — | — | — | — |
| 2 | ↑ | ↑ | ↑ | ↑ | ↑ | ↑ | ↑ |
| 3 | CFRP | ↑ | ↑ | ↑ | ↑ | ↑ | ↑ |
| 4 | ↑ | ↑ | ↑ | ↑ | ↑ | ↑ | ↑ |

TABLE 8

| JO (=PK) mm | PL (=PL') mm | Number of turns n ply ①=0° ②=±45° ③=90° | Joining method | Static torsional strength kg · m (Broken places) | State of joined portions after torsional fatigue test |
|---|---|---|---|---|---|
| — | 2,400 | 20 | Press-fit | Unacceptable: 120 | Unacceptable: Joined |
| | | ① 6 ② 8 ③ 6 | Depth of press-fit: 100 mm | (joined portions) | portions circumferentially slide and axially come off. |
| ↑ | ↑ | ↑ | Welding: (welding found impossible) | – | – |
| ↑ | ↑ | ↑ | Press-fit Depth of press-fit: 100 mm | Unacceptable 80 (joined portions) | Unacceptable: Joined portions circumferentially slide and axially come off. |
| ↑ | ↑ | ↑ | Welding: (welding found impossible) | — | — |

In addition, the note 1) through note 9) in the above tables are as follows.

Note 1) CFRP (PAN type): Pyrofill Prepreg, produced by Mitsubishi Rayon Co., Ltd.

Note 2) CFRP (pitch type): Granock Prepreg, produced by Nippon Oil Co., Ltd.

Note 3) CFRP: Glassfiber Prepreg, produced by Nitto Boseki Co., Ltd.

Note 4) Fe film: Fe rolled foil, produced by Izawa Metal Co., Ltd.

Note 5) Al film; Al rolled foil, produced by Izawa Metal Co., Ltd.

Note 6) Epoxy type (solution): Weld Bond, produced by Sunstar Giken co., Ltd.

Note 7) Nitrile Phenol type: Heat Adhesive Tape, produced by Sony Chemical Co., Ltd.

Note 8) Epoxy type (film): Scotch Weld, produced by Sumitomo Three M Co., Ltd.

Note 9) Before use, the tape was perforated to have holes of 10 mm in diameter with a hole density of 2,500/m².

The power transmission shaft according to the present invention, though light in weight because of being a FRP hollow shaft, comprises a central region consisting of FRP layers alone, a transitional region composed of a composite layer consisting of FRP layers and metal layers, and end portions composed of metal layers alone; therefore, firm joining to metal joint elements at the shaft ends become possible, and the shaft is highly reliable during long term use. Therefore, the invention solves various problems involved in using an FRP shaft as (an intermediate shaft in) a propeller shaft connected to the power transmission system of an automobile through constant velocity joints at opposite ends in order to reduce the weight and cost of the propeller shaft. Further, the invention is applicable, with the same merits, to power transmission shafts used, not only in automobiles, but in ships, various industrial machines and aircraft.

What is claimed is:

1. A power transmission shaft in the form of a tubular composite shaft formed by winding a membrane, film, foil or thin sheet in layers, comprising a longitudinal middle portion composed of fiber reinforced plastic layers alone, a transitional portion disposed between the middle portion and end portions and composed of a composite layer of fiber reinforced plastic layers laminate-bonded with metal layers, said end portions being composed of metal layers alone.

2. A power transmission shaft as set forth in claim 1, characterized in that the fiber reinforced plastic layers are formed of prepreg of PAN type carbon fibers by the pipe rolling method.

3. A power transmission shaft as set forth in claim 1, characterized in that the fiber reinforced plastic layers are formed of prepreg of pitch type carbon fibers by the pipe rolling method.

4. A power transmission shaft as set forth in claim 2 or 3, characterized in that the thickness of the prepreg sheet is from 5 μm to 300 μm.

5. A power transmission shaft as set forth in claim 2 or 3, characterized in that the breaking strength of at least one of said fibers is 100 kgf/mm² (980 Mpa) or above.

6. A power transmission shaft as set forth in claim 1, characterized in that the metal layers are made of iron or an iron type alloy.

7. A power transmission shaft as set forth in claim 1, characterized in that the metal layers are made of aluminum or an aluminum type alloy.

8. A power transmission shaft as set forth in claim 1, characterized in that the thickness of each metal layer is from 1 μm to 300 μm.

9. A power transmission shaft as set forth in claim 1, characterized in that an adhesive is interposed between said metal layers.

10. A power transmission shaft as set forth in claim 1, characterized in that the shaft has an overall length in the range from 50 mm to 11,000 mm and an outer diameter in the range from 10 mm to 250 mm.

11. A power transmission shaft as set forth in claim 1, characterized in that the lengths of the end portion on at least one shaft end side and the transitional portion adjoining thereto are 10 mm or above and less that 50% of the overall length.

12. An automobile propeller shaft constructed by joining a metal joint element to at least one end of a power transmission shaft as set forth in claim 1.

13. An automobile propeller shaft constructed by joining constant velocity joints to the opposite ends of a power transmission shaft as set forth in claim 1.

* * * * *